(12) United States Patent
Nagasaka

(10) Patent No.: US 11,066,106 B2
(45) Date of Patent: Jul. 20, 2021

(54) VERSATILE PLATFORM

(71) Applicant: SOMIC MANAGEMENT HOLDINGS INC., Tokyo (JP)

(72) Inventor: Satoshi Nagasaka, Shizuoka (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 18 days.

(21) Appl. No.: 16/500,218

(22) PCT Filed: Feb. 23, 2018

(86) PCT No.: PCT/JP2018/006810
§ 371 (c)(1),
(2) Date: Oct. 2, 2019

(87) PCT Pub. No.: WO2018/186047
PCT Pub. Date: Oct. 11, 2018

(65) Prior Publication Data
US 2020/0139802 A1 May 7, 2020

(30) Foreign Application Priority Data

Apr. 4, 2017 (JP) .............................. JP2017-074124

(51) Int. Cl.
*B62D 24/04* (2006.01)
*B60K 1/04* (2019.01)
(Continued)

(52) U.S. Cl.
CPC ................ *B62D 24/04* (2013.01); *B60K 1/04* (2013.01); *B62D 21/02* (2013.01); *H01M 50/20* (2021.01);
(Continued)

(58) Field of Classification Search
CPC .. B60K 1/04; B60K 2001/0438; B62D 21/02; H01M 2/1083; H01M 2220/20
See application file for complete search history.

(56) References Cited

U.S. PATENT DOCUMENTS 4,545,458 A * 10/1985 Jones ..................... B60K 17/30
180/238
4,637,413 A * 1/1987 Llewellyn ............... B08B 3/006
134/111
(Continued)

FOREIGN PATENT DOCUMENTS

JP 53-126234 U 10/1978
JP 2000-211312 A 8/2000
(Continued)

OTHER PUBLICATIONS

International Search Report issued in corresponding International Application No. PCT/JP2018/006810 dated May 15, 2018 (with English translation).

*Primary Examiner* — Erez Gurari
(74) *Attorney, Agent, or Firm* — Troutman Pepper Hamilton Sanders LLP

(57) ABSTRACT

Provided is a versatile platform having high versatility without increasing its weight. A versatile platform is used for a transport vehicle for crops, a security robot, or the like. The versatile platform includes a first axle, a second axle, a pair of first wheels and, a pair of second wheels, motors and for driving the four wheels, a first steering portion for steering the first wheels, a second steering portion for steering the second wheels, and a battery support portion. A vehicle body frame integrally joins the first axle and the second axle and supports a work unit for performing operation. The vehicle body frame includes horizontal bar mem- (Continued)

bers and vertical bar members and is formed into a frame shape. The whole upper surface of the vehicle body frame is exposed to the outside.

9 Claims, 7 Drawing Sheets

(51) Int. Cl.
 *B62D 21/02* (2006.01)
 *H01M 50/20* (2021.01)
(52) U.S. Cl.
 CPC . *B60K 2001/0438* (2013.01); *H01M 2220/20* (2013.01)

(56) References Cited

U.S. PATENT DOCUMENTS

| | | | |
|---|---|---|---|
| 6,378,955 B1* | 4/2002 | Adamson | B60B 3/16 |
| | | | 301/108.4 |
| 2012/0324856 A1* | 12/2012 | Geiger | A01D 34/71 |
| | | | 56/320.2 |
| 2013/0154218 A1* | 6/2013 | Tiilikainen | B62B 3/16 |
| | | | 280/79.11 |
| 2015/0328994 A1* | 11/2015 | Chen | B62D 61/08 |
| | | | 180/65.31 |
| 2016/0355092 A1* | 12/2016 | Higuchi | B62D 21/02 |
| 2017/0129522 A1* | 5/2017 | Lee | B62B 5/0053 |
| 2017/0136864 A1* | 5/2017 | Ito | A01D 34/82 |
| 2017/0144056 A1* | 5/2017 | Evans | G05D 1/0276 |
| 2018/0022390 A1* | 1/2018 | Cai | B60K 17/165 |
| | | | 180/252 |
| 2018/0319263 A1* | 11/2018 | Hegewald | B60K 1/04 |
| 2018/0370577 A1* | 12/2018 | Takahashi | B60K 1/04 |
| 2019/0185056 A1* | 6/2019 | Lowery, Jr. | B62D 33/02 |
| 2019/0185057 A1* | 6/2019 | Lowery, Jr. | B60L 50/66 |
| 2020/0001700 A1* | 1/2020 | Wolf-Monheim | F16H 7/06 |
| 2020/0122661 A1* | 4/2020 | Pawlowski | B60K 1/04 |
| 2020/0283067 A1* | 9/2020 | Reineke | B60G 7/005 |
| 2020/0324817 A1* | 10/2020 | Hammond, Jr. | B60G 7/001 |

FOREIGN PATENT DOCUMENTS

| | | |
|---|---|---|
| JP | 2008-49740 A | 3/2008 |
| JP | 2013-066395 A | 4/2013 |
| JP | 2013-530088 A | 7/2013 |
| JP | 3204751 U | 6/2016 |
| JP | 2016-209049 A | 12/2016 |

\* cited by examiner

VERSATILE PLATFORM

CROSS REFERENCE TO RELATED APPLICATIONS

This is a U.S. National Phase Application under 35 U.S.C. § 371 of International Patent Application No. PCT/JP2018/006810, filed Feb. 23, 2018, which claims priority of Japanese Patent Application No. 2017-074124, filed Apr. 4, 2017. The entire contents of which are hereby incorporated by reference.

FIELD OF THE INVENTION

The present invention relates to a versatile platform including wheels driven by a motor.

BACKGROUND

There have been conventionally known vehicles, trucks, transport vehicles, and the like including wheels driven by a motor. Examples thereof are disclosed in JP-A-2016-209049, JP-A-2013-66395 and JP-A-2000-211312. A vehicle disclosed in JP-A-2016-209049 includes a chassis, four wheels attached to the chassis, a motor for driving the wheels, and a mounting table on which people or luggage is mounted. A housing of a control apparatus for controlling the motor (hereinafter, simply referred to as "housing") and the mounting table are provided on an upper surface of the chassis. A truck disclosed in JP-A-2013-66395 includes a vehicle body frame, four wheels attached to the vehicle body frame, a motor for driving the wheels, and a worktable. The motor and the worktable are provided on an upper surface of the vehicle body frame. A transport vehicle disclosed in JP-A-2000-211312 includes a vehicle body frame, four wheels attached to the vehicle body frame, a motor for driving the wheels, and a cargo bed. The motor and the cargo bed are provided on an upper surface of the vehicle body frame.

However, in order to replace the mounting table of the vehicle disclosed in JP-A-2016-209049 with another work unit, the housing that covers part of the upper surface of the chassis may hinder this replacement. In order to replace the worktable of the truck disclosed in JP-A-2013-66395 with another work unit or in order to replace the cargo bed of the transport vehicle disclosed in JP-A-2000-211312 with another work unit, the motor provided on the upper surface of the vehicle body frame may hinder this replacement. Thus, the vehicle, the truck, and the transport vehicle disclosed in JP-A-2016-209049, JP-A-2013-66395 and JP-A-2000-211312 cannot be diverted to another use and therefore have a problem of low versatility.

Note that, for diversion to another use, it is also considered that the mounting table, the worktable, and the cargo bed support another work unit. In this case, however, the mounting table, the worktable, and the cargo bed do not perform their original functions. This reduces efficiency in a physical configuration. Therefore, there arises a problem of an unnecessary increase in weight.

SUMMARY

The present invention solves the above-mentioned problems. That is, an object of the present invention is to provide a versatile platform having high versatility without increasing its weight.

In order to achieve the object described above, a feature of a versatile platform according to the present invention is a versatile platform configured as a vehicle including: a first axle extending in a vehicle width direction of the vehicle; a second axle separate from the first axle and extending in parallel to the first axle; a pair of first wheels provided in one end portion and the other end portion of the first axle; a pair of second wheels provided in one end portion and the other end portion of the second axle; a motor for driving at least one of the pair of first wheels and the pair of second wheels; a vehicle body frame integrally joining the first axle and the second axle and supporting a work unit for performing operation; and a steering portion for steering at least one of the pair of first wheels and the pair of second wheels. The vehicle body frame includes a horizontal bar member extending in parallel to both the first axle and the second axle and a vertical bar member extending in a front-back direction of the vehicle in which the first axle and the second axle separate from each other and is formed into a frame shape; and the whole upper surface of the vehicle body frame is exposed to the outside.

With this configuration, the whole upper surface of the vehicle body frame is exposed to the outside. Thus, it is possible to support various kinds of work units while freely using the upper surface of the vehicle body frame. This makes it possible to improve versatility of the versatile platform. Further, the vehicle body frame has a function of integrally joining the first axle and the second axle (function as a framework) and a function of supporting the work unit. This makes it possible to improve efficiency in a physical configuration. In addition, weight of the whole vehicle can be reduced, which results in improvement in driving performance.

Further, the pair of first wheels is joined by the first axle. Further, the pair of second wheels is joined by the second axle (i.e., a rigid axle method is employed). This improves a grounding property to a road surface. Thus, the above-mentioned configuration has excellent bad-road driving performance. Further, the vehicle body frame is formed into a frame shape. Thus, it is possible to tie a rope or the like to the vehicle body frame. For example, the above-mentioned configuration can also be used to extract a root of a tree by using a rope. As described above, the above-mentioned configuration has various excellent functions. Thus, because those functions synergistically work, it is possible to use the above-mentioned configuration in various uses. As a result, extremely high versatility is achieved.

Another feature of the present invention is that at least one of two side surfaces of at least one of the horizontal bar member and the vertical bar member is exposed to the outside.

In this configuration, it is possible to fix the work unit also to the side surfaces of the at least one of the horizontal bar member and the vertical bar member. This makes it possible to support various kinds of work units.

Another feature of the present invention is a hollow portion formed in the vehicle body frame in at least one direction of the vehicle width direction and the front-back direction.

In this configuration, the hollow portion is formed in the vehicle body frame that supports the work unit. Thus, this hollow portion can house electrical wiring belonging to the work unit. This makes it possible to protect the electrical wiring against water, a stone, or the like splashed or hit upward from a road surface. Further, this hollow portion can also house electrical wiring of the motor included in this versatile platform. This makes it possible to also protect this electrical wiring. Further, a hole can be processed in the hollow portion. With this, the electrical wiring can be taken into and out from the hollow portion through an arbitrary position.

Furthermore, the hollow portion can house various components and accessories other than the electrical wiring. Thus, the functions of the versatile platform can be improved according to use. For example, a weight balance of the versatile platform may be deteriorated depending on a position of the work unit supported by the vehicle body frame. In this case, by the hollow portion housing a weight, the weight balance can be improved. Note that a cross-sectional shape of the hollow portion can be formed into a circular (including oval) shape, a rectangular shape, or a polygonal shape. In this case, by forming the cross-sectional shape of the hollow portion into a circular shape, it is possible to prevent damage caused by concentration of stress on corner portions that is due to force applied to the vehicle body frame. As a result, it is possible to restrain rigidity of the vehicle body frame from being reduced.

Another feature of the present invention is a fixing portion provided in at least one of the horizontal bar member and the vertical bar member so as to extend in the whole length in a length direction thereof. This fixing portion fixes the work unit supported by the vehicle body frame.

In this configuration, in a case where the fixing portion is provided in the horizontal bar member, it is possible to select a fixing position of the work unit in the vehicle width direction. Meanwhile, in a case where the fixing portion is provided in the vertical bar member, it is possible to select the fixing position of the work unit in the front-back direction.

Another feature of the present invention is that the fixing portion is a groove provided in at least one of the horizontal bar member and the vertical bar member so as to extend in a length direction thereof.

In this configuration, it is possible to freely select the fixing position of the work unit within a range of the length of the groove.

Another feature of the present invention is that the horizontal bar member and the vertical bar member are configured to be separable from each other.

The vehicle body frame is easily damaged when the vehicle runs on a bad road or the like. In the above-mentioned configuration, however, it is possible to immediately replace a damaged horizontal bar member or vertical bar member. This makes it possible to reduce repairing time and also reduce repairing costs.

Another feature of the present invention is a battery for supplying power to the motor and a battery support portion that is provided in the vehicle body frame and supports the battery. This battery is disposed between the pair of first wheels and the pair of second wheels so that an upper surface thereof is positioned below the upper surface of the vehicle body frame.

In this configuration, the battery does not project upward from the upper surface of the vehicle body frame. This makes it possible to effectively use a space above the vehicle body frame. Further, a center of gravity position of the battery is low. In addition, weight of the battery is received by the four wheels in good balance. Thus, this configuration has excellent stability and driving performance.

Another feature of the present invention is that the center of gravity of the battery is disposed at a position that is equally distant from the pair of first wheels and the pair of second wheels.

In this configuration, the pair of first wheels and the pair of second wheels can equally receive the weight of the battery. Thus, even in a case where the vehicle repeatedly moves forward and backward, this configuration has excellent operational stability.

Another feature of the present invention is that the battery support portion includes a support plate on which the battery is mounted.

In this configuration, the support plate can be disposed between the battery and the road surface. This makes it possible to protect the battery against a stone or the like on the road surface hit by the first wheels or the second wheels.

Another feature of the present invention is that a first cover covering the first axle is provided at the first axle and a second cover covering the second axle is provided at the second axle.

In this configuration, also in a case where the first axle and the second axle move or incline in a vertical direction, the first cover and the second cover integrally move therewith. Thus, the first cover and the second cover can effectively protect the first axle and the second axle.

Another feature of the present invention is that a steering portion including a driving source is provided in at least one of the first axle and the second axle.

In this configuration, the steering portion including the driving source (e.g., electric motor) is provided in at least one of the first axle and the second axle. Thus, the steering portion securely steers at least one of the first wheels and the second wheels while integrally vertically moving with the first axle and the second axle that vertically move at the time of running. In addition, it is possible to simplify the configuration of the versatile platform and reduce weight thereof.

DETAILED DESCRIPTION

Figure 1:
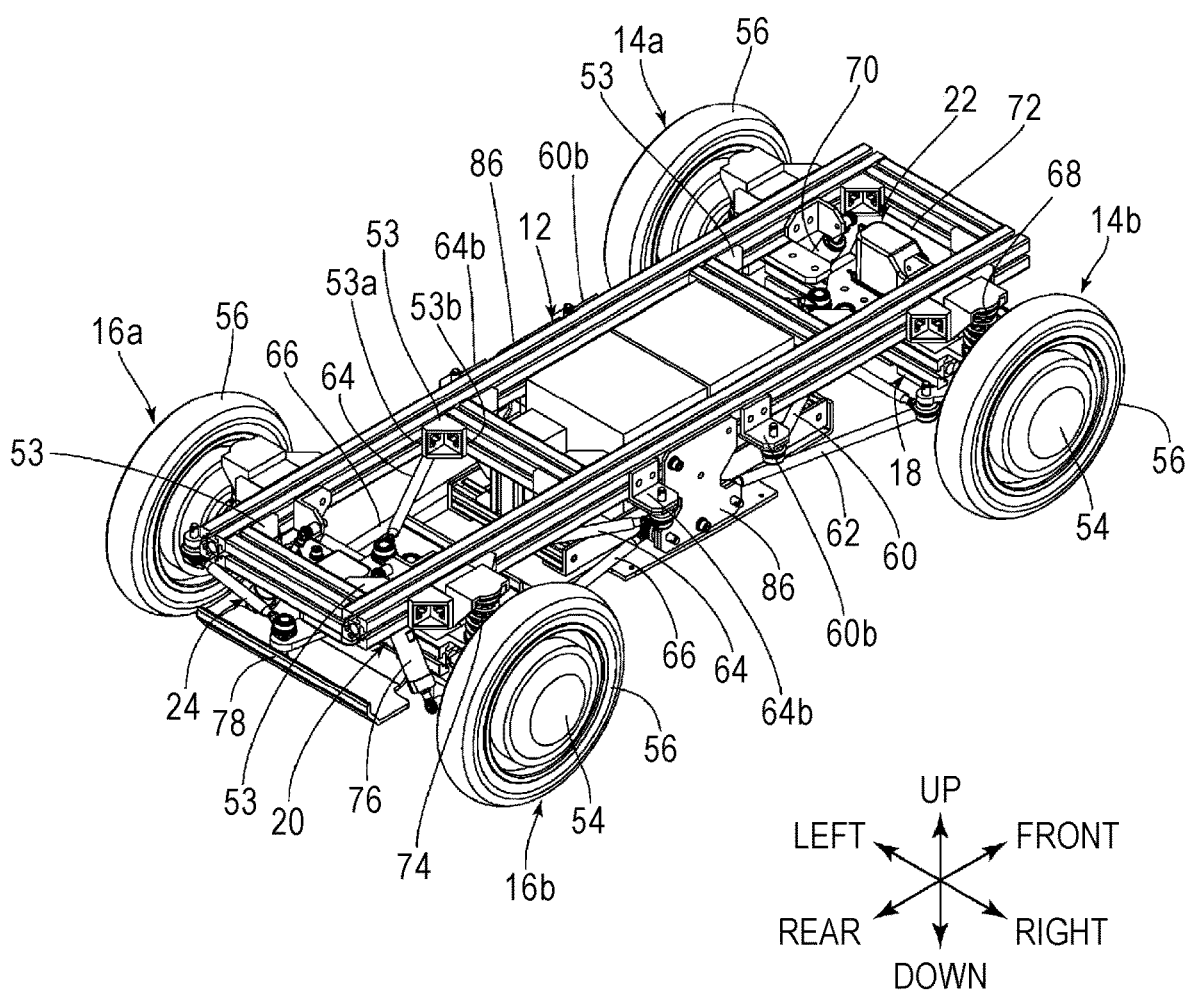
FIG. 1 is a perspective view seen from diagonally above, which illustrates a configuration of a versatile platform according to an embodiment of the present invention.

Hereinafter, an embodiment of a versatile platform according to the present invention will be described with reference to the drawings. Note that the versatile platform according to the present invention can be used without being conscious of front, rear, left, and right directions. However, hereinafter, description will be made by using the "front, rear, left, and right" directions for convenience of explanation. "Front, rear, left, right, upward, and downward" directions used in the following description correspond to directions indicated by arrows in the drawings.

(Configuration of the Versatile Platform 10)

Figure 2:
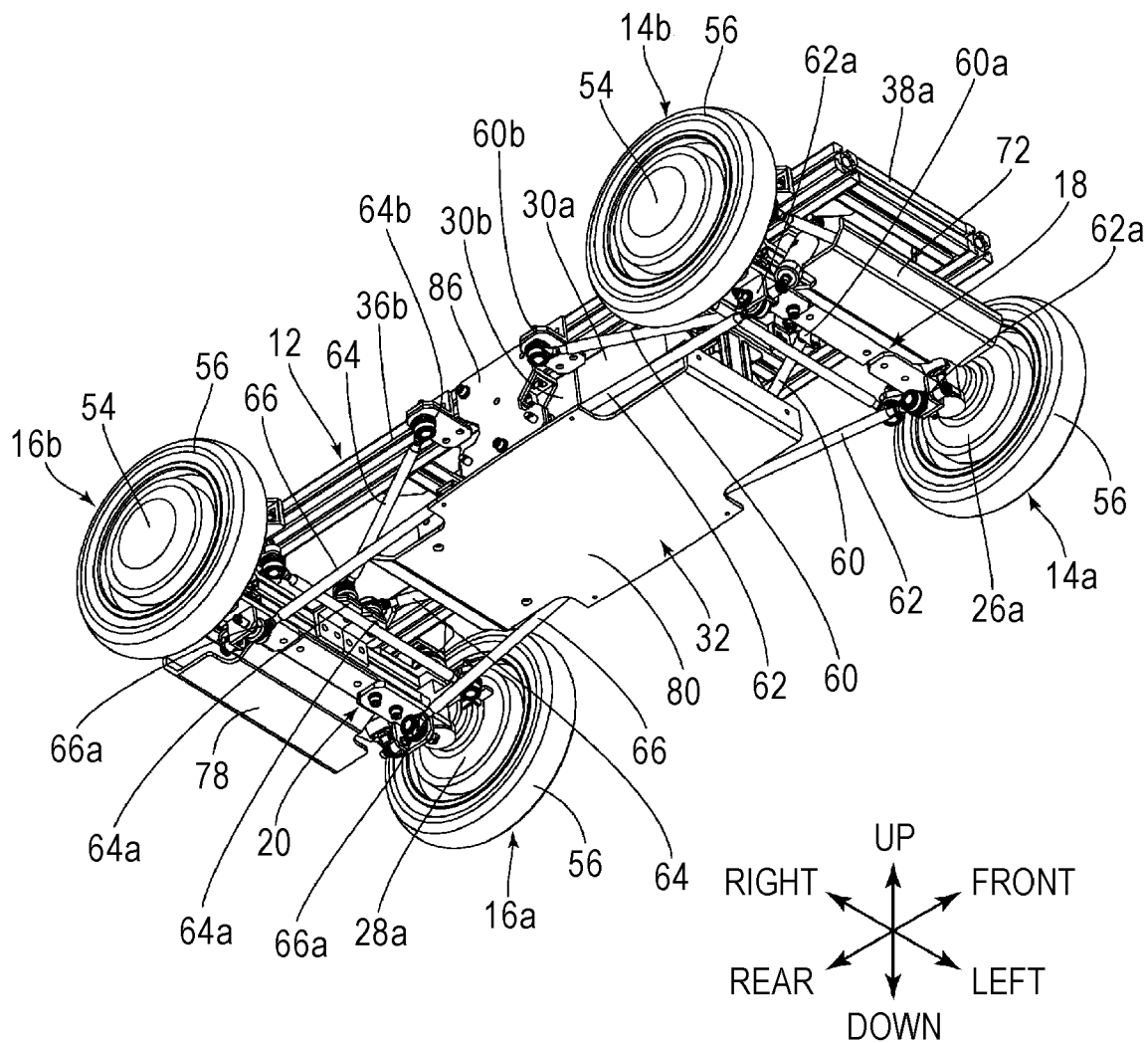
FIG. 2 is a perspective view seen from diagonally below, which illustrates a configuration of a versatile platform according to an embodiment of the present invention.
Figure 3:
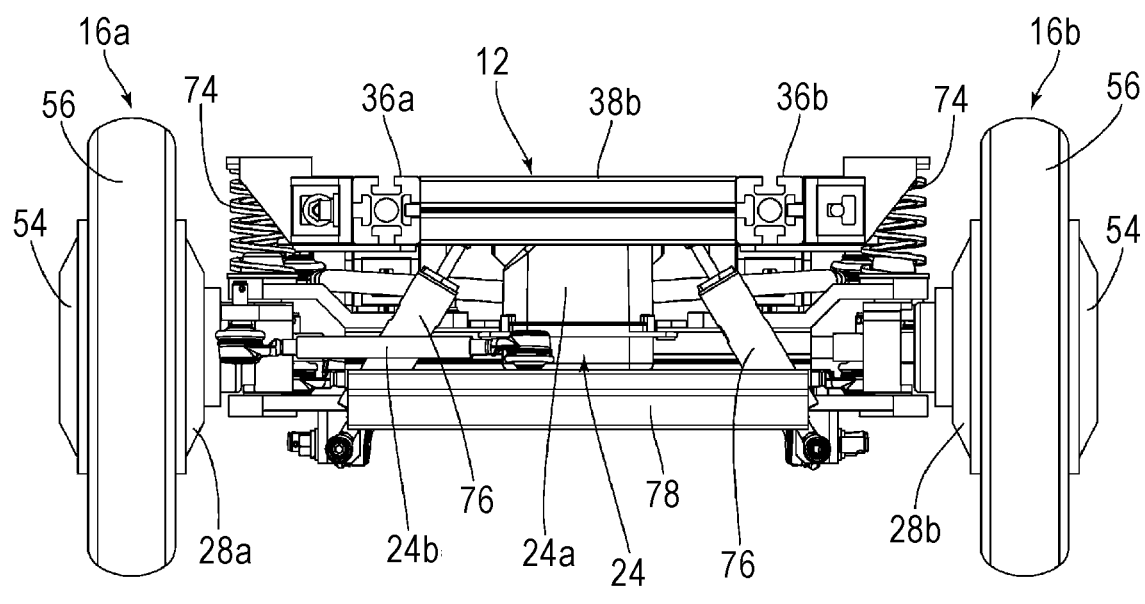
FIG. 3 is a front view illustrating a configuration of a versatile platform according to an embodiment of the present invention.
Figure 4:
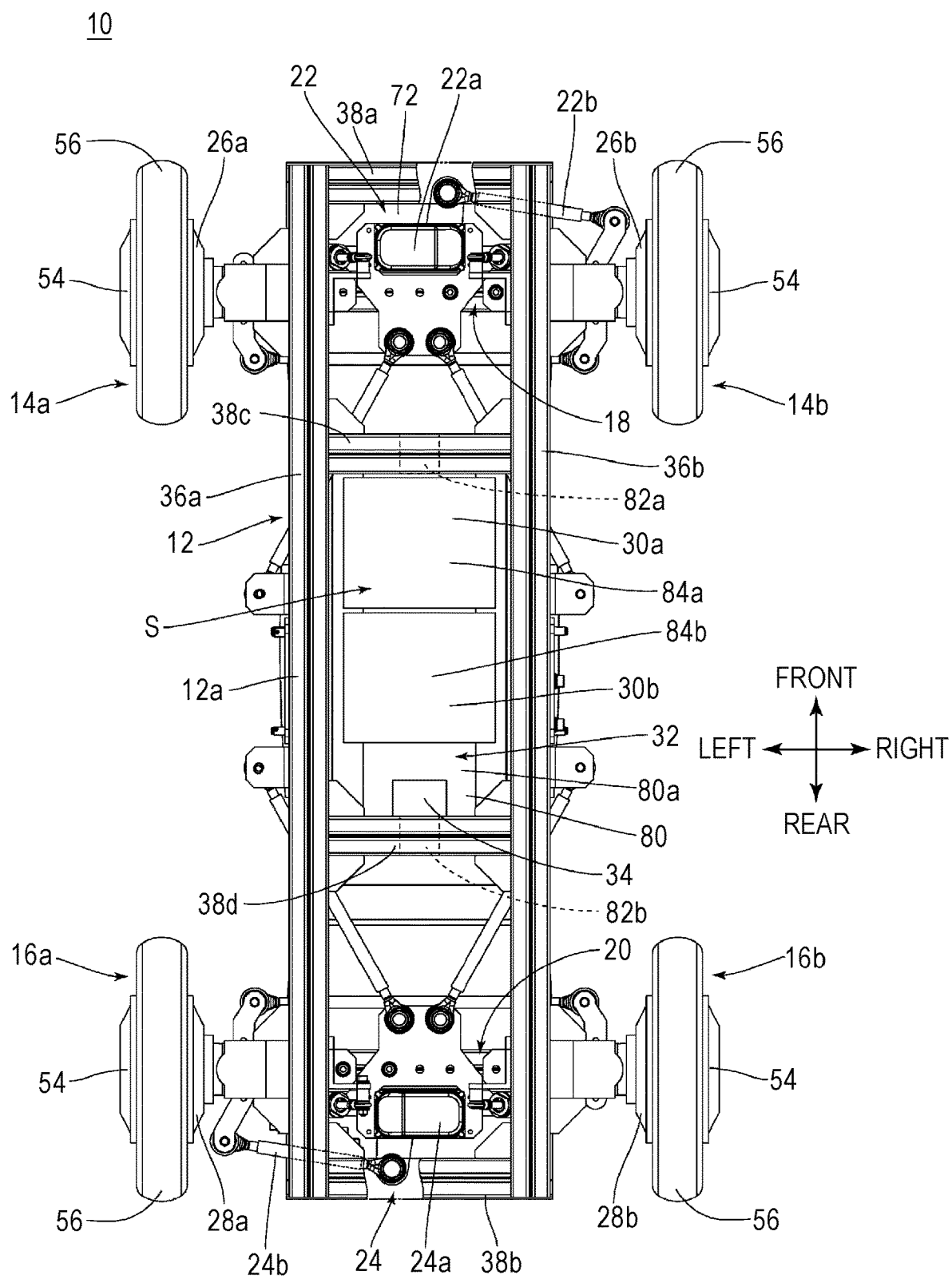
FIG. 4 is a plan view illustrating a configuration of a versatile platform according to an embodiment of the present invention.
Figure 5:
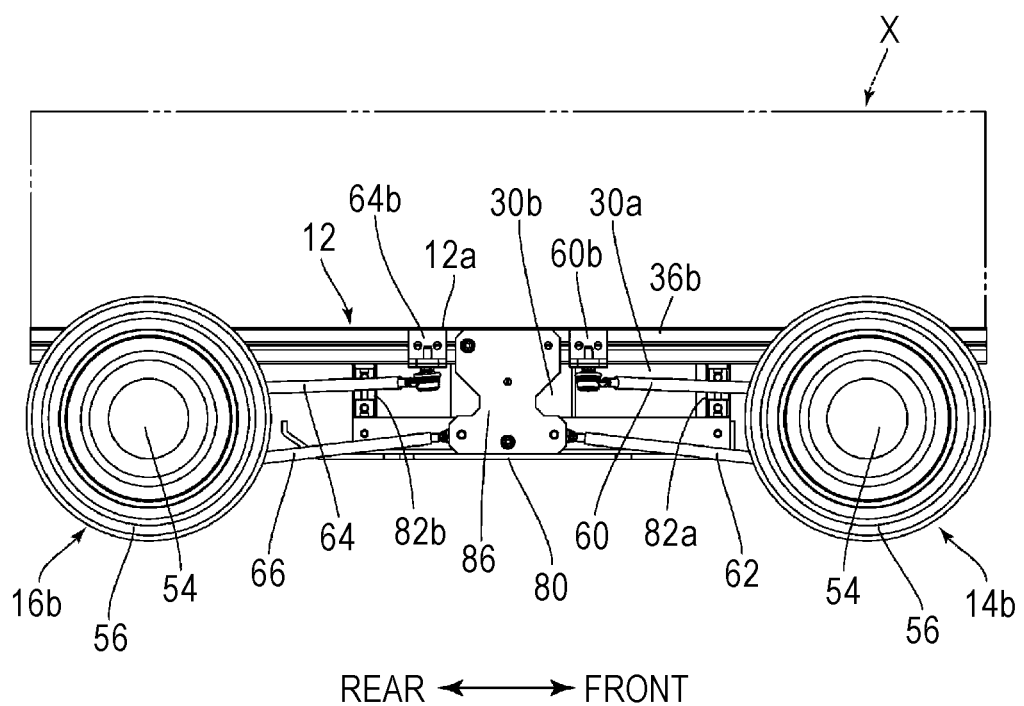
FIG. 5 is a right side view illustrating a configuration of a versatile platform according to an embodiment of the present invention.
Figure 6:
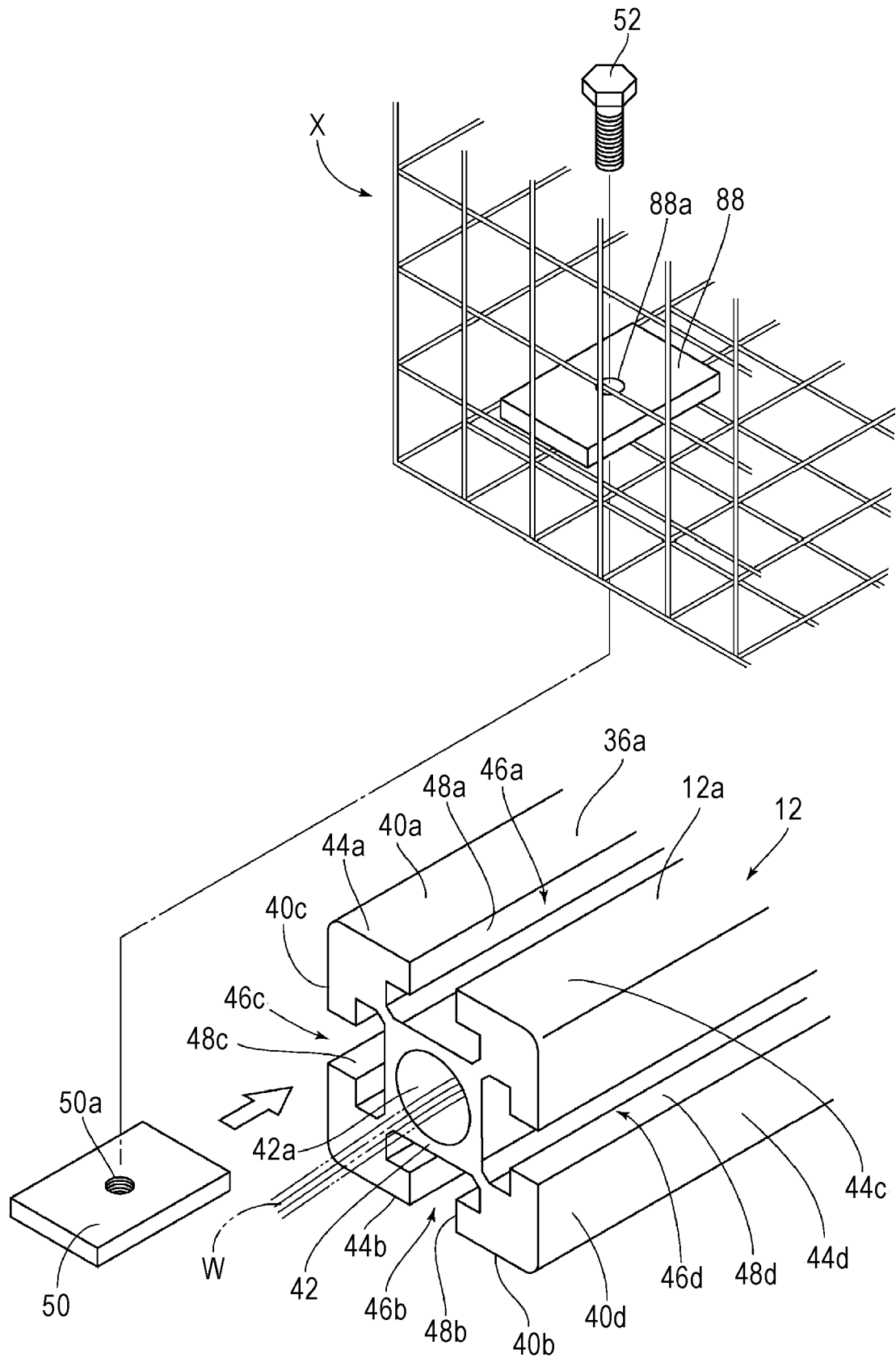
FIG. 6 is a perspective view illustrating a method of fixing a work unit to grooves serving as "fixing portions".
Figure 7:
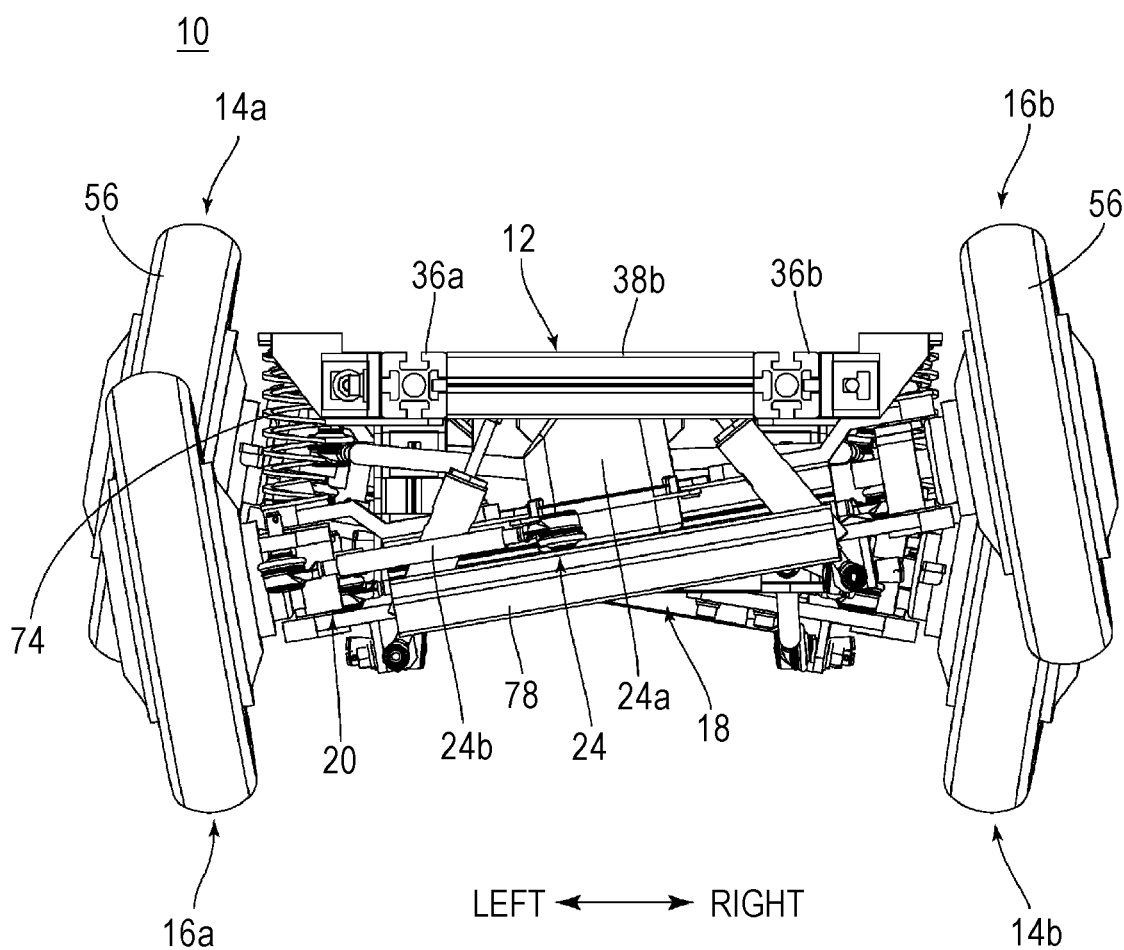
FIG. 7 is a front view illustrating an operation state of a first axle and a second axle in a versatile platform according to an embodiment of the present invention.

FIG. 1 is a perspective view seen from diagonally above, which illustrates a configuration of a versatile platform 10 according to the embodiment of the present invention. FIG. 2 is a perspective view seen from diagonally below, which illustrates the configuration of the versatile platform 10. FIG. 3 is a front view illustrating the configuration of the versatile platform 10. FIG. 4 is a plan view illustrating the configuration of the versatile platform 10. FIG. 5 is a right side view illustrating the configuration of the versatile platform 10. FIG. 6 is a perspective view illustrating a method of fixing a work unit X to grooves 46a, 46b, 46c, and 46d serving as "fixing portions". FIG. 7 is a front view illustrating an operation state of a first axle 18 and a second axle 20.

The versatile platform 10 illustrated in FIG. 1 is configured as a vehicle on which the work unit X (FIG. 6) is mounted. As illustrated in FIG. 1, the versatile platform 10 includes a vehicle body frame 12, a pair of first wheels 14a and 14b, a pair of second wheels 16a and 16b, the first axle 18 that joins the pair of first wheels 14a and 14b to each other, and the second axle 20 that joins the pair of second wheels 16a and 16b to each other. Further, the versatile platform 10 includes a first steering portion 22 for steering the pair of first wheels 14a and 14b and a second steering portion 24 for steering the pair of second wheels 16a and 16b. Furthermore, as illustrated in FIG. 4, the versatile platform 10 includes first motors 26a and 26b for driving the first wheels 14a and 14b, second motors 28a and 28b for driving the second wheels 16a and 16b, batteries 30a and 30b for supplying power to those members, a battery support portion 32 that supports the batteries 30a and 30b, and a controller 34.

As illustrated in FIG. 4, the vehicle body frame 12 includes two vertical bar members 36a and 36b extending in a direction (front-back direction) orthogonal to a vehicle width direction and four horizontal bar members 38a, 38b, 38c, and 38d extending in the vehicle width direction (crosswise direction) and is formed into a frame shape. Note that the vehicle width direction (crosswise direction) corresponds to a direction parallel to both the first axle 18 and the second axle 20 described below. The direction (front-back direction) orthogonal to the vehicle width direction corresponds to a direction in which the first axle 18 and the second axle 20 separate from each other.

As illustrated in FIG. 4, the two vertical bar members 36a and 36b are disposed in parallel to each other so as to have an interval therebetween. One end portions (front end portions) thereof are joined by the horizontal bar member 38a. The other end portions (rear end portions) thereof are joined by the horizontal bar member 38b. Further, the horizontal bar member 38c is stretched on a side that is slightly closer to one end side (front side) than a central portion in a length direction of the two vertical bar members 36a and 36b. A horizontal bar member 38d is stretched on a side that is slightly closer to the other end side (rear side) than the central portion in the length direction of the two vertical bar members 36a and 36b. The whole upper surface 12a of the vehicle body frame 12 is exposed to the outside. Note that, in this embodiment, the upper surface 12a of the vehicle body frame 12 is formed by a smooth flat surface. However, the upper surface 12a may be uneven depending on a component or shape that is necessary to fix the work unit X.

As illustrated in FIG. 6, the vertical bar member 36a is a bar made from aluminum. An upper surface 40a, a lower surface 40b, a one side surface 40c, and the other side surface 40d thereof are formed into a flat shape. The vertical bar member 36a has a hollow portion 42 having a circular hole 42a at a center thereof. Furthermore, the vertical bar member 36a has four corner portions 44a, 44b, 44c, and 44d forming four corners thereof. The grooves 46a, 46b, 46c, and 46d are formed by the hollow portion 42 and the corner portions 44a, 44b, 44c, and 44d in the upper surface 40a, the lower surface 40b, the one side surface 40c, and the other side surface 40d, respectively. In other words, the four grooves 46a, 46b, 46c, and 46d are provided along the hollow portion 42 on an outer surface of the vertical bar member 36a.

Width of the grooves 46a, 46b, 46c, and 46d is reduced at openings 48a, 48b, 48c, 48d thereof, respectively. Therefore, a fixing plate 50 having width wider than width of the openings 48a, 48b, 48c, 48d can be inserted into each of the grooves 46a, 46b, 46c, and 46d from an end portion thereof. At this time, the fixing plate 50 can be caught by each of the openings 48a, 48b, 48c, 48d. This makes it possible to prevent the fixing plate 50 from falling. Note that a screw hole 50a with which a bolt 52 for fixing the work unit X is engaged is provided in the fixing plate 50.

The vertical bar member 36b and the horizontal bar members 38a, 38b, 38c, and 38d illustrated in FIG. 4 are configured in the same way as the vertical bar member 36a. In other words, in this embodiment, the grooves 46a, 46b, 46c, and 46d (FIG. 6) serving as the "fixing portions" and the hollow portion 42 are provided in each of the vertical bar members 36a and 36b and the horizontal bar members 38a, 38b, 38c, and 38d so as to extend in the whole length in the length direction thereof. In the vertical bar members 36a and 36b and the horizontal bar members 38a, 38b, 38c, and 38d, the whole upper surfaces 40a are exposed to the outside, and part of the lower surface 40b, the one side surface 40c, and the other side surface 40d is exposed to the outside.

As illustrated in FIG. 1, the hollow portion 42 (FIG. 6) of each of the two vertical bar members 36a and 36b is open toward both end portions in the front-back direction of the vehicle body frame 12. The hollow portion 42 (FIG. 6) of each of the four horizontal bar members 38a, 38b, 38c, and 38d is blocked by the vertical bar members 36a and 36b at both end portions in the vehicle width direction of the vehicle body frame 12. Note that the hollow portion 42 of each of the vertical bar members 36a and 36b may be blocked by the horizontal bar members 38a and 38b at both end portions in the front-back direction of the vehicle body frame 12. The hollow portion 42 (FIG. 6) of each of the horizontal bar members 38a and 38b may be open toward the both end portions in the vehicle width direction of the vehicle body frame 12.

As illustrated in FIG. 1, each of the two vertical bar members 36a and 36b and each of the four horizontal bar members 38a, 38b, 38c, and 38d are joined by a fixture 53 so as to be separable from each other. Each fixture 53 includes a first fixing plate portion 53a and a second fixing plate portion 53b. The first fixing plate portion 53a is fixed to one of the two vertical bar members 36a and 36b with a bolt (not illustrated). The second fixing plate portion 53b is fixed to one of the four horizontal bar members 38a, 38b, 38c, and 38d with a bolt (not illustrated). The first fixing plate portion 53a, as well as the work unit X illustrated in FIG. 6, is fixed, by using the fixing plate 50 and the bolt 52, to the groove 46c or 46d serving as the "fixing portion" provided in one of the vertical bar members 36a and 36b. The second fixing plate portion 53b, as well as the work unit X illustrated in FIG. 6, is fixed, by using the fixing plate 50 and the bolt 52, to the groove 46c or 46d serving as the "fixing portion" provided in one of the horizontal bar members 38a, 38b, 38c, and 38d. Therefore, it is possible to adjust attachment positions of the horizontal bar members 38a, 38b, 38c, and 38d to the vertical bar members 36a and 36b in the length direction of the vertical bar members 36a and 36b according to use.

As illustrated in FIG. 1, each of the pair of first wheels 14a and 14b and the pair of second wheels 16a and 16b includes a wheel 54 made from metal and a tire 56 made from rubber and attached to a periphery of the wheel 54. The inside of the tire 56 is filled with foaming filler (not illustrated). In other words, the tires 56 of the first wheels 14a and 14b and the second wheels 16a and 16b are puncture less tires.

As illustrated in FIG. 2, the first axle 18 and the second axle 20 are bar-like members extending in the vehicle width direction (crosswise direction) of the vehicle. In this embodiment, a main part of each of the first and second axles 18 and 20 is formed as a bar-like member similar to the vertical bar member 36a illustrated in FIG. 6. In other words, each of the first and second axles 18 and 20 has the hollow portion 42 (FIG. 6). The first axle 18 is attached to the vehicle body frame 12 via a pair of upper links 60 and 60 and a pair of lower links 62 and 62. The second axle 20 is attached to the vehicle body frame 12 via a pair of upper links 64 and 64 and a pair of lower links 66 and 66.

As illustrated in FIG. 2, one end portions (front end portions) of the pair of upper links 60 and 60 are connected to the first axle 18 via connection portions 60a and 60a, respectively. The other end portions (rear end portions) of the pair of upper links 60 and 60 are connected to the vehicle body frame 12 via connection portion 60b and 60b, respectively. One end portions (front end portions) of the pair of lower links 62 and 62 are connected to the first axle 18 via connection portions 62a and 62a, respectively. The other end portions (rear end portions) of the pair of lower links 62 and 62 are connected to the vehicle body frame 12 via connection portions 86 and 86, respectively.

As illustrated in FIG. 2, one end portions (rear end portions) of the pair of upper links 64 and 64 are connected to the second axle 20 via connection portions 64a and 64a, respectively. The other end portions (front end portions) of the pair of upper links 64 and 64 are connected to the vehicle body frame 12 via connection portions 64b and 64b, respectively. One end portions (rear end portions) of the pair of lower links 66 and 66 are connected to the second axle 20 via connection portions 66a and 66a, respectively. The other end portions (front end portions) of the pair of lower links 66 and 66 are connected to the vehicle body frame 12 via the connection portions 86 and 86, respectively.

Each of the connection portions 60b, 60b, 86, 86, 64b, and 64b illustrated in FIG. 2, as well as the work unit X illustrated in FIG. 6, is fixed, by using the fixing plate 50 and the bolt 52, to the groove 46c or 46d serving as the "fixing portion" provided in the vertical bar member 36a or 36b. Therefore, it is possible to adjust positions at which the first axle 18 and the second axle 20 are attached to the vehicle body frame 12 in the length direction of the vertical bar members 36a and 36b according to use.

As illustrated in FIG. 4, the first wheel 14a is attached to one end portion (left end portion) of the first axle 18 via the first motor 26a so as to be steerable. The first wheel 14b is attached to the other end portion (right end portion) of the first axle 18 via the first motor 26b so as to be steerable. The second wheel 16a is attached to one end portion (left end portion) of the second axle 20 via the second motor 28a so as to be steerable. The second wheel 16b is attached to the other end portion (right end portion) of the second axle 20 via the second motor 28b so as to be steerable. In other words, a rigid axle method and a four-wheel drive method are employed in the versatile platform 10. In addition, a four-wheel steering method is employed.

As illustrated in FIG. 1, a pair of coil springs 68 and 68 and a pair of shock absorbers 70 and 70 are provided between the first axle 18 and the vehicle body frame 12. The first steering portion 22 for steering the first wheels 14a and 14b is provided at a central portion in the length direction of the first axle 18. The first steering portion 22 includes a steering motor 22a serving as a driving source. A first cover 72 covering an outer side (front side) of the first axle 18 is provided at an outer portion (front portion) of the first axle 18. As illustrated in FIG. 4, the first steering portion 22 includes the steering motor 22a and a link mechanism 22b. When the link mechanism 22b is driven by the steering motor 22a, the pair of first wheels 14a and 14b is simultaneously steered.

As illustrated in FIG. 1, a pair of coil springs 74 and 74 and a pair of shock absorbers 76 and 76 are provided between the second axle 20 and the vehicle body frame 12. The second steering portion 24 for steering the second wheels 16a and 16b is provided at a central portion in the length direction of the second axle 20. The second steering portion 24 includes a steering motor 24a serving as a driving source. A second cover 78 covering an outer side (rear side) of the second axle 20 is provided at an outer portion (rear portion) of the second axle 20. As illustrated in FIGS. 3 and 4, the second steering portion 24 includes the steering motor 24a and a link mechanism 24b. When the link mechanism 24b is driven by the steering motor 24a, the pair of second wheels 16a and 16b is simultaneously steered.

Note that the pair of first wheels 14a and 14b may be individually steered by using two steering motors and two link mechanisms. Further, the pair of second wheels 16a and 16b may be individually steered by using two steering motors and two link mechanisms. With this, it is possible to individually steer the first wheels 14a and 14b and the second wheels 16a and 16b. Thus, the versatile platform 10 can change a direction without moving.

The first motors 26a and 26b and the second motors 28a and 28b illustrated in FIG. 4 are in-wheel motors. Specifically, those in-wheel motors are provided in the wheels 54 of the first wheels 14a and 14b and the second wheels 16a and 16b, respectively. Note that those motors 26a, 26b, 28a, and 28b may be provided not only in the wheels 54 (in-wheel type) but also out of the wheels 54.

The batteries 30a and 30b illustrated in FIG. 4 are power supply apparatuses that supply power to various kinds of electrical equipment included in the versatile platform 10. The various kinds of electrical equipment include the first motors 26a and 26b, the second motors 28a and 28b, the steering motors 22a and 24a, and the controller 34. In this embodiment, the two batteries 30a and 30b are provided side by side in the direction (front-back direction) orthogonal to the vehicle width direction. Note that the number of batteries is not particularly limited. A single battery may be provided. Alternatively, three or more batteries may be provided.

The battery support portion 32 illustrated in FIG. 4 supports the batteries 30a and 30b below the vehicle body frame 12. As illustrated in FIG. 2, the battery support portion 32 includes a support plate 80 on which the batteries 30a and 30b are mounted. As illustrated in FIG. 5, one end portion (front end portion) of the support plate 80 is joined to the horizontal bar member 38c (FIG. 4) of the vehicle body frame 12 via a bar-like joining member 82a extending in a vertical direction. The other end portion (rear end portion) of the support plate 80 is joined to the horizontal bar member 38d (FIG. 4) of the vehicle body frame 12 via a bar-like joining member 82b extending in the vertical direction.

As illustrated in FIG. 4, the battery support portion 32 of this embodiment is provided at a central portion in the length direction of the vehicle body frame 12. Therefore, the batteries 30a and 30b supported by the battery support portion 32 are disposed between the pair of first wheels 14a and 14b and the pair of second wheels 16a and 16b. Further, a distance from an upper surface (battery mounting surface) 80a of the support plate 80 on which the batteries 30a and 30b are mounted to the upper surface 12a of the vehicle body frame 12 is set to be longer than a length in the vertical direction of the batteries 30a and 30b. With this, upper surfaces 84a and 84b of the batteries 30a and 30b are disposed below the upper surface 12a of the vehicle body frame 12. In other words, the batteries 30a and 30b are disposed so that the upper surfaces 84a and 84b thereof are positioned below the upper surface 12a of the vehicle body frame 12. Therefore, as illustrated in FIG. 5, the batteries 30a and 30b do not project upward from the upper surface 12a of the vehicle body frame 12.

The controller 34 illustrated in FIG. 4 is configured by a microcomputer including a CPU, a ROM, a RAM, and the like. The controller 34 is attached to a side surface of the horizontal bar member 38d in an area S interposed between the two horizontal bar members 38c and 38d. In this embodiment, the two batteries 30a and 30b are disposed in the area S. The controller 34 is disposed far from the batteries 30a and 30b in the area S.

The first motors 26a and 26b, the second motors 28a and 28b, and the steering motors 22a and 24a are electrically connected to the controller 34. The controller 34 causes the CPU to execute control programs stored on the ROM. With this, the controller 34 controls operation of those electrical components.

(Operation of Versatile Platform 10)

As illustrated in FIG. 6, in a case where the versatile platform 10 is used, the work unit X according to use is mounted on the upper surface 12a of the vehicle body frame 12. Further, this work unit X is fixed, by using the fixing plates 50 and 88 and the bolt 52, to at least one of the grooves 46a, 46b, 46c, and 46d (FIG. 4) serving as the "fixing portions".

For example, in a case where the versatile platform 10 is used for a transport vehicle for crops, a cargo box housing crops is necessary. Thus, as illustrated in FIG. 6, the "cargo box" serving as the work unit X is mounted on the upper surface 12a of the vehicle body frame 12. Then, the fixing plates 50 are inserted into the grooves 46a provided in the upper surfaces 40a of the vertical bar members 36a and 36b and the horizontal bar members 38a, 38b, 38c, and 38d (FIG. 4). Then, the fixing plates 88 are mounted on an upper surface of a bottom portion of the "cargo box" (work unit X). Thereafter, the bolts 52 are inserted into penetration holes 88a of the fixing plates 88. Then, the bolts 52 are inserted into meshes of the cargo box and are engaged with the screw holes 50a of the fixing plates 50.

Further, information such as a path through which the versatile platform 10 moves is input to the controller 34 (FIG. 4) by using an input apparatus (not illustrated). When control operation of the controller 34 (FIG. 4) is started, the CPU executes programs stored on the ROM. With this, operation of each of the first motors 26a and 26b, the second motors 28a and 28b, and the steering motors 22a and 24a is controlled. Thus, the versatile platform 10 executes various kinds of operation such as forward movement, backward movement, stop, and turning movement in accordance with the input information such as the path.

The rigid axle method is employed in the versatile platform 10 illustrated in FIGS. 1 and 2. Thus, as illustrated in FIG. 7, in a case where the vehicle runs on a bad road, it is possible to interlock the pair of first wheels 14a and 14b and interlock the pair of second wheels 16a and 16b. As a result, a high grounding property can be obtained. Further, as illustrated in FIG. 4, the first steering portion 22 and the second steering portion 24 are provided on the first axle 18 and the second axle 20, respectively. Thus, it is possible to obtain high steering performance even on a bad road.

Note that the versatile platform 10 illustrated in FIGS. 1 and 2 can be used for various uses such as not only the above-mentioned transport vehicle for crops but also a transport vehicle for machine components used in a factory, a security robot, a monitoring robot, an investigating vehicle that includes a camera and is used in a disaster site and the like, a wheelchair, and a truck for carrying an injured person or sick person. In those cases, a cargo bed, various kinds of sensors, a camera, a chair, a bed, and the like serving as the work unit X (FIG. 6) are mounted on the upper surface 12a of the vehicle body frame 12 according to use of the versatile platform 10. In other words, the work unit X is formed as a machine, an instrument, or an apparatus that performs operation corresponding to the use of the versatile platform 10.

In a case where the work unit X illustrated in FIG. 6 is an electric machine, instrument, or apparatus including the electrical wiring W, the electrical wiring W is housed by the hollow portion 42 of one of the vertical bar members 36a and 36b and the horizontal bar members 38a, 38b, 38c, and 38d as indicated by two-dot chain lines in FIG. 6. In this case, a user can process a hole (not illustrated) at an arbitrary position on a side wall of the hollow portion 42 by using an electric drill or the like. With this, the electrical wiring W can be taken in and out through the arbitrary position of the hollow portion 42.

(Effects of Versatile Platform 10)

According to this embodiment, the above-mentioned configuration can have the following effects. Specifically, the whole upper surface 12a of the vehicle body frame 12 is exposed to the outside. Thus, it is possible to support various kinds of work units X while freely using the upper surface 12a of the vehicle body frame 12. Thus, the versatile platform 10 has high versatility. The vehicle body frame 12 has a function of integrally joining the first axle 18 and the second axle 20 (function as a framework) and a function of supporting the work unit X. Thus, the versatile platform 10 has a highly efficient physical configuration. That is, there is no problem such as an unnecessary increase in weight.

As illustrated in FIG. 4, the two side surfaces 40c and 40d between which the upper surface 40a (FIG. 6) of each of the horizontal bar members 38a, 38b, 38c, and 38d and the vertical bar members 36a and 36b is interposed are also exposed to the outside. Thus, it is possible to fix the work unit X also to the side surfaces 40c and 40d. This makes it possible to support various kinds of work units X.

As illustrated in FIG. 4, the pair of first wheels 14a and 14b is joined by the first axle 18. Further, the pair of second wheels 16a and 16b is joined by the second axle 20 (i.e., the rigid axle method is employed). Thus, the versatile platform 10 has an excellent grounding property to a road surface. The pair of first wheels 14a and 14b and the pair of second wheels 16a and 16b are driven by the first motors 26a and 26b and the second motors 28a and 28b, respectively (i.e., the four-wheel drive method is employed). In addition, the rigid axle method is employed, and thus the versatile platform 10 has excellent bad-road driving performance. The pair of first wheels 14a and 14b and the pair of second wheels 16a and 16b are steered by the steering portions 22 and 24, respectively (i.e., the four-wheel steering method is employed). Thus, the versatile platform 10 can turn in a small radius.

As illustrated in FIG. 1, the vehicle body frame 12 is formed into a frame shape. Thus, it is possible to tie a rope or the like to the vehicle body frame 12. For example, the versatile platform 10 can also be used to extract a root of a tree by using a rope.

As illustrated in FIG. 6, the hollow portion 42 is formed in the vehicle body frame 12 that supports the work unit X. This hollow portion 42 can house the electrical wiring W of the work unit X. This makes it possible to protect the electrical wiring W against water, a stone, or the like splashed or hit upward from a road surface. The hollow portion 42 can also house electrical wiring (not illustrated) of the motors 26a, 26b, 28a, and 28b. This makes it possible to similarly protect this electrical wiring.

As illustrated in FIG. 6, in this embodiment, the grooves 46a, 46b, 46c, and 46d are provided along the hollow portion 42. Thus, in a case where a hole (not illustrated) is processed in the hollow portion 42, a blade of a drill inserted into the grooves 46a, 46b, 46c, and 46d through the openings 48a, 48b, 48c, 48d can be pushed against the hollow portion 42. Therefore, it is possible to easily process a hole in the hollow portion 42.

The hollow portion 42 illustrated in FIG. 6 is provided in all the vertical bar members 36a and 36b and the horizontal bar members 38a, 38b, 38c, and 38d. This improves a degree of freedom for selecting a wiring path of the electrical wiring W.

Each of the first and second axles 18 and 20 illustrated in FIG. 1 includes the hollow portion 42 (FIG. 6). Thus, the hollow portion 42 (FIG. 6) can house electrical wiring (not illustrated) of each of the first motors 26a and 26b, the second motors 28a and 28b, and the steering motors 22a and 24a illustrated in FIG. 4 and protect the electrical wiring.

The hollow portion illustrated in FIG. 6 can house various components or accessories other than the electrical wiring W. Thus, the functions of the versatile platform 10 can be improved according to use. For example, a weight balance of the versatile platform 10 may be deteriorated depending on the position of the work unit X supported by the vehicle body frame 12. In this case, by the hollow portion 42 housing a linear or bar-like weight (not illustrated), the weight balance can be improved.

As illustrated in FIG. 1, the hollow portion 42 of each of the two vertical bar members 36a and 36b is open toward the both end portions in the front-back direction of the vehicle body frame 12. Thus, various components or accessories can be taken into the hollow portion 42 through the both end portions in the front-back direction of the vehicle body frame 12. In addition, it is possible to easily drain water that has entered the hollow portion. Therefore, the open hollow portion 42 may be horizontally formed. However, by inclining the hollow portion 42 from the horizontal direction, drainage performance can be improved. Further, the hollow portion 42 of each of the four horizontal bar members 38a, 38b, 38c, and 38d is blocked in the both end portions in the vehicle width direction of the vehicle body frame 12. Thus, water and foreign matters hardly enter the hollow portion 42. This makes it possible to effectively protect the electrical wiring W (FIG. 6) and the like.

The grooves 46a, 46b, 46c, and 46d serving as the "fixing portions" illustrated in FIG. 6 are provided in each of the vertical bar members 36a and 36b and the horizontal bar members 38a, 38b, 38c, and 38d (FIG. 4). Thus, it is possible to select the fixing position of the work unit X in both the front-back direction and the vehicle width direction. It is also possible to freely select the fixing position of the work unit X within a range of the length of the grooves 46a, 46b, 46c, and 46d.

As illustrated in FIG. 1, the versatile platform 10 is configured so that each of the two vertical bar members 36a and 36b and each of the four horizontal bar members 38a, 38b, 38c, and 38d are separable from each other by using the fixture 53. Thus, it is possible to immediately replace only a damaged member among those members. This makes it possible to reduce repairing time and also reduce repairing costs.

As illustrated in FIG. 5, the batteries 30a and 30b do not project upward from the upper surface 12a of the vehicle body frame 12. This makes it possible to effectively use a space above the vehicle body frame 12. Further, center of gravity positions of the batteries 30a and 30b having large weight are low. Thus, the versatile platform 10 has excellent stability. As illustrated in FIG. 4, the batteries 30a and 30b having large weight are disposed between the pair of first wheels 14a and 14b and the pair of second wheels 16a and 16b. Thus, the weight of the batteries 30a and 30b can be received by the four wheels 14a, 14b, 16a, and 16b in good balance. Thus, the versatile platform has excellent driving performance.

As illustrated in FIG. 2, the battery support portion 32 includes the support plate 80 on which the batteries 30a and 30b are mounted. Thus, the support plate 80 can be disposed between the batteries 30a and 30b and a road surface. This makes it possible to protect the batteries 30a and 30b against a stone or the like on the road surface hit by the first wheels 14a and 14b or the second wheels 16a and 16b.

As illustrated in FIG. 2, the first cover 72 covering the outer side (front side) of the first axle 18 is provided at the first axle 18. The second cover 78 covering the outer side (rear side) of the second axle 20 is provided at the second axle 20. Thus, when the first axle 18 and the second axle 20 move, the first cover 72 and the second cover 78 also move together. This makes it possible to effectively protect the first axle 18 and the second axle 20.

As illustrated in FIG. 4, the first steering portion 22 including the steering motor 22a is provided on the first axle 18. The second steering portion 24 including the steering motor 24a is provided on the second axle 20. Thus, even when the first axle 18 and the second axle 20 vertically move, it is possible to securely steer the pair of first wheels 14a and 14b and the pair of second wheels 16a and 16b. Further, it is unnecessary to additionally provide components for supporting the first steering portion 22 and the second steering portion 24. Thus, it is possible to simplify the configuration of the versatile platform 10 and reduce weight thereof.

As described above, the versatile platform 10 of this embodiment has various excellent functions. Thus, because those functions synergistically work, it is possible to use the versatile platform 10 in various uses. As a result, extremely high versatility is achieved.

MODIFICATION EXAMPLES

Note that the present invention is not limited to the above-mentioned embodiment and can be variously changed without departing from the object of the present invention. For example, in the above-mentioned embodiment, the four-wheel drive method and the four-wheel steering method are employed. However, a two-wheel drive method may be employed. In the two-wheel drive method, only one of the pair of first wheels 14a and 14b and the pair of second wheels 16a and 16b is driven. Further, a two-wheel steering method may be employed. In the two-wheel steering method, only one of the pair of first wheels 14a and 14b and the pair of second wheels 16a and 16b is steered.

As illustrated in FIG. 4, in the above-mentioned embodiment, a built-in power supply method is employed as a method of supplying power to various kinds of electrical equipment. In the built-in power supply method, the batteries 30a and 30b supply power in a wired manner. However, an external power supply method of supplying power from the outside in a wired or wireless manner may be employed. In a case where the external power supply method is employed, the batteries 30a and 30b can be omitted.

As illustrated in FIGS. 1 and 5, in the above-mentioned embodiment, the pair of first wheels 14a and 14b and the pair of second wheels 16a and 16b are provided to project from the vehicle body frame 12 toward the outside in the vehicle width direction. However, those wheels may be provided below the vehicle body frame 12 within the vehicle width of the vehicle body frame 12 (not illustrated). That is, the vehicle body frame 12 may be formed above all the first wheels 14a and 14b and the second wheels 16a and 16b so as to have a size or shape to cover the first wheels 14a and 14b and the second wheels 16a and 16b.

In the above-mentioned embodiment, the hollow portion 42 and the grooves 46a, 46b, 46c, and 46d illustrated in FIG. 6 are provided in each of the vertical bar members 36a and 36b and the horizontal bar members 38a, 38b, 38c, and 38d illustrated in FIG. 4. However, those hollow portion and grooves may be provided in one of the vertical bar members 36a and 36b and the horizontal bar members 38a, 38b, 38c, and 38d. In other words, the hollow portion 42 and the grooves 46a, 46b, 46c, and 46d illustrated in FIG. 6 may be provided in at least one direction of the vehicle width direction and the front-back direction. Further, the hollow portion 42 and the grooves 46a, 46b, 46c, and 46d may be omitted.

Further, in the above-mentioned embodiment, the grooves 46a, 46b, 46c, and 46d are provided along the hollow portion 42. With this, there are thin parts on side walls of the hollow portion 42 where the grooves 46a, 46b, 46c, and 46d are formed. Thus, holes are easily processed on the side walls. However, the hollow portion 42 and the grooves 46a, 46b, 46c, and 46d may be provided at different positions.

At least one of the four grooves 46a, 46b, 46c, and 46d (FIG. 6) may be provided in the vertical bar members 36a and 36b and the horizontal bar members 38a, 38b, 38c, and 38d illustrated in FIG. 4. For example, only the groove 46a of the upper surface 40a illustrated in FIG. 6 may be provided. At least one of the two side surfaces 40c and 40d between which the upper surface 40a is interposed, which are illustrated in FIG. 6, may be exposed to the outside. Alternatively, both the two side surfaces may be covered by another component or the like.

As illustrated in FIG. 6, in the above-mentioned embodiment, the grooves 46a, 46b, 46c, and 46d are provided as the "fixing portions" for fixing the work unit X. However, instead of those grooves, a plurality of penetration holes (not illustrated) may be provided. Also in this case, the plurality of penetration holes (not illustrated) is provided in the whole length in the length direction of the vertical bar members 36a and 36b and the horizontal bar members 38a, 38b, 38c, and 38d. With this, it is possible to select the fixing position of the work unit X (FIG. 6) or attachment positions of the first axle 18 and the second axle 20. Further, with the fixing portions formed as the penetration holes, it is possible to easily perform wiring in the hollow portion 42. It is also possible to easily visually recognize a state in the hollow portion 42.

As illustrated in FIG. 4, in the above-mentioned embodiment, the center of gravity of the whole two batteries 30a and 30b is disposed at a position slightly shifted from a central portion in the length direction of the versatile platform 10. However, this center of gravity may be disposed at the central portion in the length direction of the versatile platform 10. Further, this center of gravity may be disposed at a position that is equally distant from the pair of first wheels 14a and 14b and the pair of second wheels 16a and 16b. In this case, the pair of first wheels 14a and 14b and the pair of second wheels 16a and 16b can equally receive the weight of the batteries 30a and 30b. This makes it possible to stabilize operation even in a case where forward movement and backward movement are repeated.

As illustrated in FIG. 2, in the above-mentioned embodiment, the first cover 72 is provided at the first axle 18. Further, the second cover 78 is provided at the second axle 20. However, the first cover 72 and the second cover 78 may be omitted. Further, as illustrated in FIG. 4, in the above-mentioned embodiment, the first steering portion 22 is provided on the first axle 18. Further, the second steering portion 24 is provided on the second axle 20. However, the first steering portion 22 and the second steering portion 24 may be provided on components independent from the first axle 18 and the second axle 20.

The invention claimed is:

1. A versatile platform configured as a vehicle, comprising:
    a first axle extending in a vehicle width direction of the vehicle;
    a second axle separate from the first axle and extending in parallel to the first axle;
    a pair of first wheels provided in one end portion and the other end portion of the first axle;
    a pair of second wheels provided in one end portion and the other end portion of the second axle;
    a motor for driving at least one of the pair of first wheels and the pair of second wheels;
    a vehicle body frame integrally joining the first axle and the second axle and supporting a work unit for performing operation; and
    a steering portion for steering at least one of the pair of first wheels and the pair of second wheels, wherein:
    the vehicle body frame includes a horizontal bar member extending in parallel to both the first axle and the second axle and a vertical bar member extending in a front-back direction of the vehicle in which the first axle and the second axle separate from each other and is formed into a frame shape; and
    the whole upper surface of the vehicle body frame is exposed to the outside,
    wherein at least one of the horizontal bar member and the vertical bar member has a fixing portion for fixing the work unit supported by the vehicle body frame, the fixing portion extending in the whole length in a length direction of the at least one of the horizontal bar member and the vertical bar member, and
    wherein the fixing portion is a groove provided in at least one of the horizontal bar member and the vertical bar member so as to extend in the length direction of the at least one of the horizontal bar member and the vertical bar member.

2. The versatile platform according to claim 1, wherein at least one of two side surfaces of at least one of the horizontal bar member and the vertical bar member is exposed to the outside.

3. The versatile platform according to claim 1, wherein the vehicle body frame has a hollow portion in at least one direction of the vehicle width direction and the front-back direction.

4. The versatile platform according to claim 1, wherein the horizontal bar member and the vertical bar member are configured to be separable from each other.

5. The versatile platform according to claim 1, further comprising:
a battery for supplying power to the motor; and
a battery support portion provided in the vehicle body frame and supporting the battery, wherein
the battery is disposed between the pair of first wheels and the pair of second wheels so that an upper surface of the battery is positioned below an upper surface of the vehicle body frame.

6. The versatile platform according to claim 5, wherein a center of gravity of the battery is disposed at a position that is equally distant from the pair of first wheels and the pair of second wheels.

7. The versatile platform according to claim 5, wherein the battery support portion includes a support plate on which the battery is mounted.

8. The versatile platform according to claim 1, wherein:
a first cover covering the first axle is provided at the first axle; and
a second cover covering the second axle is provided at the second axle.

9. The versatile platform according to claim 1, wherein:
the steering portion includes a driving source and is provided on at least one of the first axle and the second axle.

\* \* \* \* \*